(12) United States Patent
Yu et al.

(10) Patent No.: US 10,673,664 B1
(45) Date of Patent: Jun. 2, 2020

(54) RECEIVER AND METHOD FOR CALIBRATING FREQUENCY OFFSET

(71) Applicant: Beken Corporation, Shanghai (CN)

(72) Inventors: Caogang Yu, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 0 days.

(21) Appl. No.: 16/598,824

(22) Filed: Oct. 10, 2019

(30) Foreign Application Priority Data

Aug. 19, 2019 (CN) .......................... 2019 1 0765538

(51) Int. Cl.
*H04L 27/227* (2006.01)
*H04B 1/10* (2006.01)

(52) U.S. Cl.
CPC ......... *H04L 27/227* (2013.01); *H04B 1/1027* (2013.01)

(58) Field of Classification Search
CPC ....... H04L 2027/003; H04L 2027/0057; H04L 27/227; H04B 1/1027
See application file for complete search history.

(56) References Cited

U.S. PATENT DOCUMENTS

| 5,402,449 | A | * | 3/1995 | Schultes | H04L 27/2332 329/306 |
| 5,598,125 | A | * | 1/1997 | Makinen | H04L 27/2332 329/300 |
| 6,772,181 | B1 | * | 8/2004 | Fu | G06F 17/17 708/290 |
| 6,874,006 | B1 | * | 3/2005 | Fu | H04L 27/22 708/442 |
| 2003/0128660 | A1 | * | 7/2003 | Ito | H04L 27/2657 370/210 |
| 2005/0111601 | A1 | * | 5/2005 | Bock | H04L 27/227 375/354 |
| 2005/0124307 | A1 | * | 6/2005 | Ammar | H04B 1/38 455/183.2 |
| 2008/0126463 | A1 | * | 5/2008 | Hurley | G06F 7/4818 708/441 |
| 2016/0080016 | A1 | * | 3/2016 | Wyckoff | H04B 1/1018 375/347 |

* cited by examiner

*Primary Examiner* — Khanh C Tran
(74) *Attorney, Agent, or Firm* — Schwegman Lundberg & Woessner, P.A.

(57) ABSTRACT

A receiver comprises an I/Q demodulator generates an angular signal by demodulating an in-phase branch and a quadrature branch of a received signal; a filter communicatively coupled to the I/Q demodulator and configured to generate a filtered angular signal by filtering out a noise signal having a frequency higher than a predetermined frequency value from the angular signal; an angle subtractor communicatively coupled to the filter and configured to generate a phase signal based on the filtered angular signal; a phase calibrator communicatively coupled to the angle subtractor and configured to generate a calibrated phase signal based on at least one received preamble signal corresponding to the phase signal and a known value of the at least one received preamble signal corresponding to the phase signal; and a symbol decider communicatively coupled to the phase calibrator and configured to generate an output symbol based on the calibrated phase signal.

12 Claims, 3 Drawing Sheets

RECEIVER AND METHOD FOR CALIBRATING FREQUENCY OFFSET

CROSS-REFERENCE TO RELATED APPLICATIONS

This application claims priority to Chinese Application number 201910765538.4, filed on Aug. 19, 2019 by Beken Corporation, which is incorporated herein by reference in its entirety.

TECHNICAL FIELD

The present application generally relates to a receiver, and particularly relates to, but not exclusively, to a receiver for calibrating frequency offset and a method for calibrating frequency offset.

BACKGROUND

Conventionally, transmitters and receivers in a telecommunication system may have frequency offsets. The frequency offsets may accumulate during transmission, may cause a demodulated phase to be blurred, and eventually may cause a symbol decision error. Therefore, it is desirable to figure out an approach that can compensate the frequency offsets.

SUMMARY

Embodiments of the application may provide a receiver. The receiver may comprise: an I/Q demodulator configured to generate an angular signal by demodulating an in-phase branch and a quadrature branch of a received signal; a filter communicatively coupled to the I/Q demodulator and configured to generate a filtered angular signal by filtering out a noise signal having a frequency higher than a predetermined frequency value from the angular signal; an angle subtractor communicatively coupled to the filter and configured to generate a phase signal based on the filtered angular signal; a phase calibrator communicatively coupled to the angle subtractor and configured to generate a calibrated phase signal based on at least one received preamble signal corresponding to the phase signal and a known value of the at least one received preamble signal corresponding to the phase signal; and a symbol decider communicatively coupled to the phase calibrator and configured to generate an output symbol based on the calibrated phase signal.

Embodiments of the application may provide a method of calibrating frequency offset by a receiver. The method may comprise: generating, by an I/Q demodulator, an angular signal by demodulating an in-phase branch and a quadrature branch of a received signal; generating, by a filter communicatively coupled to the I/Q demodulator, a filtered angular signal by filtering out a noise signal having a frequency higher than a predetermined frequency value from the angular signal; generating, by an angle subtractor communicatively coupled to the filter, a phase signal based on the filtered angular signal; generating, by a phase calibrator communicatively coupled to the angle subtractor, a calibrated phase signal based on at least one received preamble signal corresponding to the phase signal and a known value of the at least one received preamble signal corresponding to the phase signal; and generating, by a symbol decider communicatively coupled to the phase calibrator, an output symbol based on the calibrated phase signal.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE ILLUSTRATED EMBODIMENTS

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below; however, any terminology intended to be interpreted in any restricted manner will be overtly and specifically defined as such in this Detailed Description section.

Figure 1:
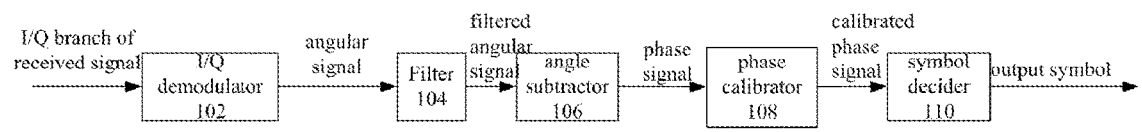
FIG. 1 is a circuit diagram that illustrates a receiver according to an embodiment of the application.

FIG. 1 is a circuit diagram that illustrates a receiver 100 according to an embodiment of the application.

The receiver 100 may comprise an I/Q demodulator 102, a filter 104, an angle subtractor 106, a phase calibrator 108, and a symbol decider 110. In some embodiments, the I/Q demodulator 102 is configured to generate an angular signal by demodulating an in-phase (I) branch and a quadrature (Q) branch of a received signal. The filter 104 is communicatively coupled to the I/Q demodulator 102, and is configured to generate a filtered angular signal by filtering out a noise signal having a frequency higher than a predetermined frequency value from the angular signal. The angle subtractor 106 is communicatively coupled to the filter 104, and is configured to generate a phase signal based on the filtered angular signal. The phase calibrator 108 is communicatively coupled to the angle subtractor 106, and is configured to generate a calibrated phase signal based on at least one received preamble signal corresponding to the phase signal and a known value of the at least one received preamble signal corresponding to the phase signal. The symbol decider 110 is communicatively coupled to the phase calibrator 108, and is configured to generate an output symbol based on the calibrated phase signal.

Figure 2:
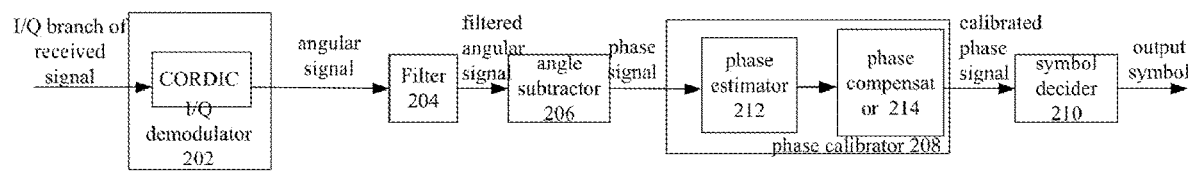
FIG. 2 is a circuit diagram that illustrates a receiver according to another embodiment of the application.

FIG. 2 is a circuit diagram that illustrates a receiver according to another embodiment of the application. The filter 204, the angle subtractor 206 and the symbol decider 210 are respectively like the filter 104, the angle subtractor 106 and the symbol decider 110 shown in FIG. 1. Therefore, their detailed descriptions are omitted for concision. Furthermore, the demodulator 202, the filter 204, the angle subtractor 206 and the phase calibrator 208 will be discussed in further details below.

Alternatively, as shown in FIG. 2, the I/Q demodulator 202 may further comprise a COordinate Rotation DIgital Computer (CORDIC) that is configured to generate the angular signal by obtaining an arctangent value of the ratio between the in-phase (I) branch and the quadrature (Q) branch of the received signal. For example, the in-phase (I) branch of the received signal represents a sine value of the received signal, while the quadrature (Q) branch of the received signal represents a cosine value of the received signal, and the CORDIC may generate the angular signal by performing arctangent operation based on the ratio between the sine value and the cosine value of the received signal, that is based on the ratio between the in-phase (I) branch and the quadrature (Q) branch of the received signal.

As for the filter 204, if a symbol rate is 1M symbols/second, the filter 204 may filter out the signals with symbol rates higher than 1.5M symbols/second. Alternatively, the filter 204 is configured to maintain at least 80% of the bandwidth energy of the signal being filtered by filtering out a noise signal that has a frequency higher than a predetermined frequency value. For example, the predetermined frequency value is 1.5 times of an effective bandwidth.

Figure 4:
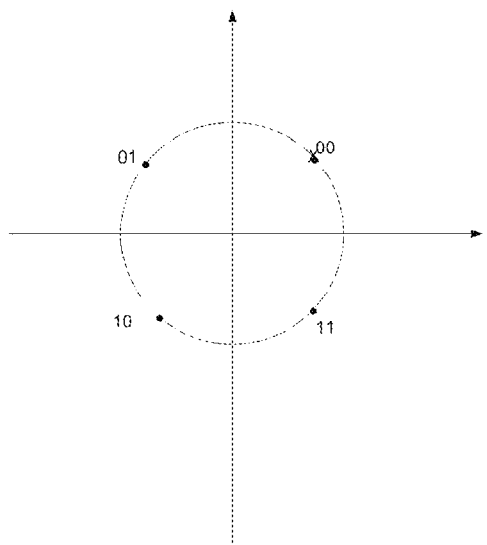
FIG. 4 is a constellation diagram for a 4-point Differential Phase Shift Keying (DPSK) according to an embodiment of the application.

The angle subtractor 206 may be configured to obtain the phase signal by calculating a phase difference $\Delta\Phi$ of phases varied in a symbol time. FIG. 4 is a constellation diagram for a 4-point DPSK according to an embodiment of the application. Such a phase difference may be reflected in a constellation diagram, such as shown in FIG. 4. For example, the phase signal may be $\pi/4$, as shown by the cross sign adjacent to the number 00 in FIG. 4. In other words, the phase signal may represent phase differences between symbols, to calculate the differences on angles based on the rates of modulated symbols.

Referring to FIG. 2, the phase calibrator 208 may further comprise a phase estimator 212 and a phase compensator 214.

The phase estimator 212 is communicatively coupled to the angle subtractor 206, and is configured to estimate the average difference between the plurality of received preamble signals and the known values of the plurality of received preamble signals. The preamble signals may be used to synchronize a data transmission by indicating the end of header information and the start of data. For example, the phase estimator 212 may receive a plurality of preamble signals. The phase estimator 212 may already know the pattern for the plurality of preamble signals. Then, the phase estimator 212 may estimate the differences between each pair of the plurality of received preamble signals and the corresponding known values of the plurality of received preamble signals by subtracting the know values from the plurality of the received preamble signals, and thus may perform an average on the plurality of subtraction results. The known values of the plurality of received preamble signals may also be called as ideal values. By performing the averaging operation, the effect of random noises can be reduced. Such a phase difference is caused by the frequency offset between the transmitter and the receiver.

A transmitter may transmit 8-16 preambles, and then the transmitter may start to transmit payload symbols. In other words, the payload symbols correspond to the preamble signals. Although the above embodiment shows that a plurality of preamble signals may be used, another embodiment may use only one preamble signal for a phase estimation. The phase estimator 212 may perform a phase estimation only based on the preamble signals, without the need of the payload symbols.

Furthermore, the phase compensator 214 is communicatively coupled to a phase estimator 212, and is configured to generate the calibrated phase signal by calibrating the payload symbol based on an average difference between the plurality of received preamble signals and the known values of the plurality of received preamble signals. For example, a phase signal of $\pi/4$ is corresponding to a known value of 75. However, because of accumulated frequency offset, a phase signal of $\pi/4$ may correspond to an actual value of 72 instead of 75. The phase estimator 212 may estimate the difference as 3, that is 75-72. The payload symbols follow the preamble signals. The phase compensator 214 therefore may compensate the payload symbols in the received signal by calibrating the payload symbol based on an average difference between the plurality of received preamble signals and the known values of the plurality of received preamble signals. The phase compensator 214 may compensate payload symbols. In other words, the preamble signal after being processed by the angle subtractor 206, may be treated by the phase estimator 212, without a treatment by the phase compensator 214. In contract, the payload symbols, after being processed by the angle subtractor 206, may skip the phase estimator 212, and enter the phase compensator 214.

The symbol decider 210 may generate an output symbol by performing symbol decision on the calibrated phase signal compensated by the phase compensator.

Alternatively, the received signal may be a Differential Phase Shift Keying (DPSK) signal. For example, the receiver may be suitable for $\pi/4$-DQPSK and 8DPSK demodulation systems, such as Bluetooth Enhanced Data Rate 2 (EDR2) and Enhanced Data Rate 3 (EDR3) demodulation systems. Alternatively, the received signal may be a Quadrature Phase Shift Keying (QPSK) signal.

Figure 3:
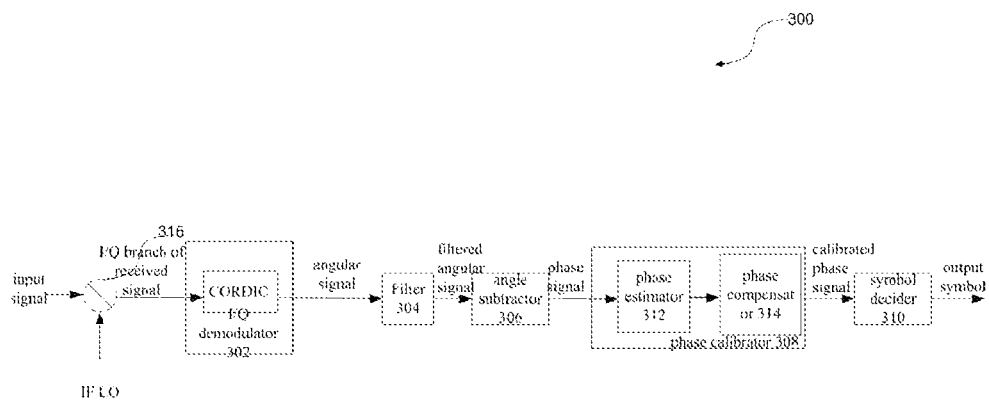
FIG. 3 is a circuit diagram that illustrates a receiver according to a further other embodiment of the application.

FIG. 3 is a circuit diagram that illustrates a receiver 300 according to a further other embodiment of the application. The I/Q demodulator 302, the filter 304, the angle subtractor 306, the phase calibrator 308, and the symbol decider 310 are respectively like the I/Q demodulator 202, the filter 204, the angle subtractor 206, the phase calibrator 208, and the symbol decider 210 as shown in FIG. 2. Furthermore, a mixer 316 will be discussed in further details below.

The receiver 300 may further comprise the mixer 316. In some embodiments, the mixer 316 is communicatively coupled to the I/Q demodulator 302, and is configured to generate the in-phase (I) branch and the quadrature (Q) branch of the received signal by mixing an input signal with an intermediate frequency (IF) local oscillation signal. Therefore, the resulting in-phase (I) branch and the quadrature (Q) branch of the received signal are fundamental frequency signal. The fundamental frequency signal means the modulated baseband signal. In other words, the fundamental frequency signal can be called as 0-IF signal.

The receiver 300 may further comprise a second mixer (not shown in FIG. 3) precedent to the mixer 316. The second mixer may use a local oscillator (LO) to mix the income radio frequency (RF) signal, so that the mixed signals are in the intermediate frequency (IF) field. The generated IF signal then may be mixed with the mixer 316 to generate fundamental frequency signal.

With at least one embodiment of the present application, the ability of anti-frequency offset by the receiver can be improved. For example, the receiver can reliably operate under an environment that crystal deviations between the transmitter and the receiver are less than 50 parts per million (ppm), as opposed to a conventional receiver which can only operate reliably under the environment that crystal deviations between the transmitter and the receiver are less than 10-20 parts per million (ppm).

Figure 5:
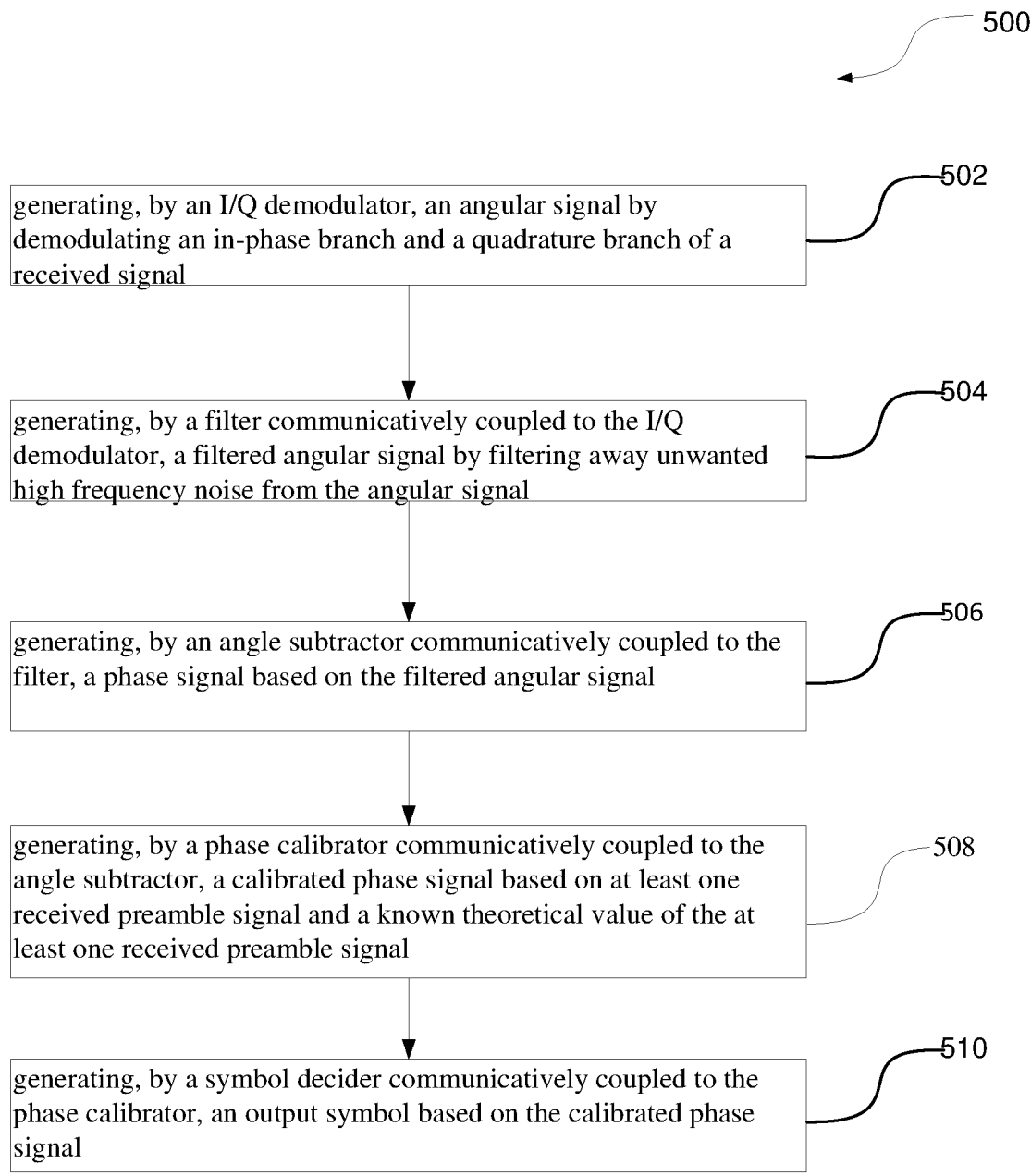
FIG. 5 is a flow chart that illustrates a method of calibrating frequency offset by a receiver according to an embodiment of the application.

FIG. 5 is a flow chart that illustrates a method 500 of calibrating frequency offset by a receiver according to an embodiment of the application.

At step 502, an I/Q demodulator may generate an angular signal by demodulating an in-phase branch (I) and a quadrature (Q) branch of a received signal.

At step 504, a filter that is communicatively coupled to the I/Q demodulator may generate a filtered angular signal by filtering out a noise signal having a frequency higher than a predetermined frequency value from the angular signal.

At step 506, an angle subtractor that is communicatively coupled to the filter may generate a phase signal based on the filtered angular signal.

At step 508, a phase calibrator that is communicatively coupled to the angle subtractor may generate a calibrated phase signal based on at least one received preamble signal corresponding to the phase signal and a known value of the at least one received preamble signal corresponding to the phase signal.

At step 510, a symbol decider that is communicatively coupled to the phase calibrator may generate an output symbol based on the calibrated phase signal.

Alternatively, in some embodiments, the at least one received preamble signal may comprise a plurality of received preamble signals. That is, instead of a single received preamble signal being used, a plurality of received preamble signals are used. In some embodiments, at step 508, a phase compensator that is communicatively coupled to a phase estimator may generate the calibrated phase signal based on an average difference between the plurality of received preamble signals and known values of the plurality of received preamble signals.

Alternatively, in some embodiments, generating at step 508, by the phase calibrator communicatively coupled to the angle subtractor, the calibrated phase signal may further comprise estimating, by the phase estimator communicatively coupled to the angle subtractor, the average difference between the plurality of received preamble signals and known values of the plurality of received preamble signals.

Alternatively, in some embodiments, generating at step 502, by the I/Q demodulator, the angular signal may further comprise generating, by a COordinate Rotation DIgital Computer (CORDIC), the angular signal by obtaining an arctangent value of the ratio between the in-phase (I) branch and the quadrature (Q) branch of the received signal.

Alternatively, in some embodiments, the received signal may be a Differential Phase Shift Keying (DPSK) signal. For example, the receiver may be suitable for π/4-DQPSK and 8DPSK demodulation systems, such as Bluetooth Enhanced Data Rate 2 (EDR2) and Enhanced Data Rate 3 (EDR3) demodulation systems.

Alternatively, in some embodiments, the received signal may be a Quadrature Phase Shift Keying (QPSK) signal.

Alternatively, in some embodiments, the method 500 may further comprise (not shown in drawings) generating, by a mixer communicatively coupled to the I/Q demodulator, the in-phase (I) branch and the quadrature (Q) branch of the received signal by mixing an input signal with a local oscillator signal.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A receiver, comprising:
   an I/Q demodulator configured to generate an angular signal by demodulating an in-phase branch and a quadrature branch of a received signal;
   a filter communicatively coupled to the I/Q demodulator and configured to generate a filtered angular signal by filtering out a noise signal having a frequency higher than a predetermined frequency value from the angular signal;
   an angle subtractor communicatively coupled to the filter and configured to generate a phase signal based on the filtered angular signal;
   a phase calibrator communicatively coupled to the angle subtractor and configured to generate a calibrated phase signal based on at least one received preamble signal corresponding to the phase signal and a known value of the at least one received preamble signal corresponding to the phase signal; and
   a symbol decider communicatively coupled to the phase calibrator and configured to generate an output symbol based on the calibrated phase signal;
   wherein the received signal includes a payload symbol corresponding to the at least one received preamble, wherein the at least one received preamble signal comprises a plurality of received preamble signals, and wherein the phase calibrator further comprises a phase compensator communicatively coupled to a phase estimator and configured to generate the calibrated phase signal by calibrating the payload symbol based on an average difference between the plurality of received preamble signals and known values of the plurality of received preamble signals.

2. The receiver of claim 1, wherein the phase estimator is communicatively coupled to the angle subtractor and configured to estimate the average difference between the plurality of received preamble signals and the known values of the plurality of received preamble signals.

3. The receiver of claim 1, wherein the I/Q demodulator further comprises a COordinate Rotation DIgital Computer (CORDIC) configured to generate the angular signal by obtaining an arctangent value of the ratio between the in-phase branch and the quadrature branch of the received signal.

4. The receiver of claim 1, wherein the received signal comprises a Differential Phase Shift Keying (DPSK) signal.

5. The receiver of claim 1, wherein the received signal comprises a Quadrature Phase Shift Keying (QPSK) signal.

6. The receiver of claim 1, further comprising a mixer communicatively coupled to the I/Q demodulator, wherein the mixer is configured to generate the in-phase branch and the quadrature branch of the received signal by mixing an input signal with an intermediate frequency local oscillation signal.

7. A method of calibrating frequency offset by a receiver, comprising:

generating, by an I/Q demodulator, an angular signal by demodulating an in-phase branch and a quadrature branch of a received signal;

generating, by a filter communicatively coupled to the I/Q demodulator, a filtered angular signal by filtering out noise signal having a frequency higher than a predetermined frequency value from the angular signal;

generating, by an angle subtractor communicatively coupled to the filter, a phase signal based on the filtered angular signal;

generating, by a phase calibrator communicatively coupled to the angle subtractor, a calibrated phase signal based on at least one received preamble signal corresponding to the phase signal and a known value of the at least one received preamble signal corresponding to the phase signal; and generating, by a symbol decider communicatively coupled to the phase calibrator, an output symbol based on the calibrated phase signal;

wherein the at least one received preamble signal comprises a plurality of received preamble signals, and wherein generating, by the phase calibrator communicatively coupled to the angle subtractor, the calibrated phase signal comprises generating, by a phase compensator communicatively coupled to a phase estimator, the calibrated phase signal based on an average difference between the plurality of received preamble signals and known values of the plurality of received preamble signals.

8. The method of claim 7, wherein generating, by the phase calibrator communicatively coupled to the angle subtractor, the calibrated phase signal further comprises estimating, by the phase estimator communicatively coupled to the angle subtractor, the average difference between the plurality of received preamble signals and known values of the plurality of received preamble signals.

9. The method of claim 7, wherein generating, by the I/Q demodulator, the angular signal further comprises generating, by a COordinate Rotation DIgital Computer (CORDIC), the angular signal by obtaining an arctangent value of the ratio between the in-phase branch and the quadrature branch of the received signal.

10. The method of claim 7, wherein the received signal comprises a Differential Phase Shift Keying (DPSK) signal.

11. The method of claim 7, wherein the received signal comprises a Quadrature Phase Shift Keying (QPSK) signal.

12. The method of claim 7, further comprising generating, by a mixer communicatively coupled to the I/Q demodulator, the in-phase branch and the quadrature branch of the received signal by mixing an input signal with an intermediate frequency local oscillation signal.

* * * * *